Patented Mar. 10, 1931

1,795,977

UNITED STATES PATENT OFFICE

HERMANN SUIDA, OF MODLING, NEAR VIENNA, AUSTRIA

PROCESS FOR OBTAINING CONCENTRATED ACETIC ACID FROM DILUTE ACETIC ACID

No Drawing. Application filed December 13, 1928, Serial No. 325,915, and in Austria January 5, 1928.

Although quinoline and its homologues, dimethyl aniline and the like difficultly or non-acetylatable bases are considerably dissolved by dilute acetic acid and are therefore not suitable by themselves for the cold extraction of dilute acetic acid, these bases may be applied with advantage for the extraction of dilute acetic acid with the object of its concentration, if they are employed in conjunction with a water repelling hydrocarbon or hydrocarbon mixture which is practically insoluble in dilute acetic acid and boils above 150° C. It is important that both constituents of the extracting mixture show a boiling point higher than 150° C., since otherwise the subsequent separation of the concentrated acetic acid does not follow smoothly.

Anthracene oil, heavy oil, paraffin oil, spindle oil, hydrogenated naphthalene, solvent naphtha, pentachlorethane, gas oil, solar oil, heavy benzine, "oil from the liquefaction of coal" containing aromatic and hydrocyclic compounds may be referred to, all being employed in admixture with known bases.

If, for example, a 30% dilute acetic acid is to be concentrated, a mixture of 1 part of anthracene oil and 1 part of quinoline may be taken as extractor and affords the following distillation an approximately 95% acetic acid, or a mixture of 2 parts "dekalin" and 1 part dimethyl aniline may be taken as extractor and readily gives on distillation a 98–99% acetic acid.

This distillation is preferably performed in a vacuum apparatus which at the same time allows a fractional distillation and continuous working to be carried out. In the said distillation apparatus a separation is effected, and on the one hand, concentrated acetic acid free from the extraction agent is obtained, and on the other hand, the extraction agent free from acetic acid.

One can, however, vary the proportions of the mixture forming the extraction agent within wide limits, adapting them on the one hand according to the degree of dilution of the dilute acetic acid, and on the other hand to the required concentration of the concentrated acetic acid to be obtained. Always however, and at least 90%, usually a completely or almost water-free acetic acid is obtained, and no appreciable quantity of the extracting agent dissolves in the waste liquor freed practically completely from the acetic acid if at least 1 part of the hydrocarbon is used to 1 part of base.

The exact amount of extraction agent efficiently employed in the process may be best determined by experimentation in any particular instance, since the amount depends largely on the quality and efficiency of the extracting apparatus used. If a number of agitators with stirring devices are applied in connection with the extracting process, such process is more efficient, and less of the extracting agent is required than where the agitators are omitted.

If, however, a distillation column containing filling material is used, the liquids are mixed in the same, but not with intense agitation, and in such case greater quantities of the extracting agent are required. It is therefore only possible to give approximate directions and to state that at the utmost two parts of extracting agent are taken for one part of acetic acid, but, however, with very efficient apparatus, one part of the extracting agent will be sufficient for one part of the acid.

Other specific examples of the process are as follows:

(a) Acetic acid of 20% is treated with a mixture of 2 parts of decahydronaphthaline and 1½ part of diethyl aniline. The extraction process yields concentrated acetic acid of 98%.

(b) A 10% acetic acid solution is treated, for instance, with a mixture of 2 parts of decahydronaphthaline and 1 part of chinoline. The concentrated acetic acid obtained is of 90 to 95%.

The advance resides in the high concentration of the resultant acetic acid obtainable and in the complete recovery of the extracting material.

The process may be carried through periodically or continually.

What I claim is:—

1. The process for obtaining concentrated acetic acid from dilute acetic acid, consisting in subjecting dilute acetic acid in the cold to an extraction with an extracting agent boiling above 150° C., which is insoluble or difficultly soluble in water, and is a mixture consisting of water-repelling hydrocarbon and a substantially non-acetylatable base, and subsequently distilling the mixture of extracting agent and acetic acid resulting, for the recovery of acetic acid.

2. The process for obtaining concentrated acetic acid from dilute acetic acid, consisting in subjecting dilute acetic acid in the cold to an extraction with an extracting agent boiling above 150° C., which is insoluble or difficultly soluble in water, and is a mixture consisting of a water-repelling hydrocarbon and a substantially non-acetylatable base, of boiling point above 150° C. and subsequently distilling the mixture of extracting agent and acetic acid resulting, for the recovery of the acetic acid.

3. The process for obtaining concentrated acetic acid from dilute acetic acid, consisting in subjecting dilute acetic acid in the cold to an extraction with an extracting agent boiling above 150° C., which is insoluble or difficultly soluble in water, and is a mixture consisting of a water-repelling hydrocarbon and a substantially non-acetylatable base, the hydrocarbon being in excess of the base, subsequently distilling the resultant mixture for the recovery of acetic acid.

4. The process for obtaining concentrated acetic acid from dilute acetic acid, consisting in subjecting dilute acetic acid in the cold to an extraction with an extracting agent boiling above 150° C., which is insoluble or difficultly soluble in water, and is a mixture consisting of a water-repelling hydro-carbon and a substantially non-acetylatable base, and subsequently distilling the mixture of extracting agent and acetic acid resulting, and condensing the acetic acid driven off.

5. The process for obtaining concentrated acetic acid from dilute acetic acid, consisting in subjecting 30% dilute acetic acid in the cold to extraction with a mixture of 1 part of anthracene oil and 1 part of quinoline, and distilling the mixture of anthracene oil, quinoline and acetic acid so obtained for the recovery of acetic acid.

In testimony whereof I affix my signature.

HERMANN SUIDA.